(12) United States Patent
Banga (10) Patent No.: US 10,713,970 B2
(45) Date of Patent: Jul. 14, 2020

(54) DRIVER EDUCATION SYSTEM AND METHOD FOR TRAINING IN SIMULATED ROAD EMERGENCIES

(71) Applicant: Ivan Banga, Newnan, GA (US)

(72) Inventor: Ivan Banga, Newnan, GA (US)

( * ) Notice: Subject to any disclaimer, the term of this patent is extended or adjusted under 35 U.S.C. 154(b) by 372 days.

(21) Appl. No.: 15/919,472

(22) Filed: Mar. 13, 2018

(65) Prior Publication Data

US 2018/0204478 A1    Jul. 19, 2018

Related U.S. Application Data

(63) Continuation-in-part of application No. 14/699,028, filed on Apr. 29, 2015, now abandoned.

(51) Int. Cl.
| | | |
|---|---|---|
| *G09B 9/05* | (2006.01) | |
| *G09B 9/052* | (2006.01) | |
| *G06T 19/00* | (2011.01) | |
| *G09B 9/042* | (2006.01) | |

(52) U.S. Cl.
CPC ............ *G09B 9/052* (2013.01); *G06T 19/006* (2013.01); *G09B 9/042* (2013.01)

(58) Field of Classification Search
CPC ........ G09B 9/052; G09B 9/042; G06T 19/006
USPC .......................................................... 434/66
See application file for complete search history.

(56) References Cited

U.S. PATENT DOCUMENTS

| | | | |
|---|---|---|---|
| 4,121,356 | A | 10/1978 | Gambon |
| 6,118,414 | A | 9/2000 | Kintz |
| 7,246,050 | B2 | 7/2007 | Sheridan |
| 2009/0028639 | A1 | 1/2009 | Thomas |
| 2010/0245387 | A1 | 9/2010 | Bachelder et al. |
| 2016/0321940 | A1 | 11/2016 | Banga |

FOREIGN PATENT DOCUMENTS

FR          WO9624918        8/1996

*Primary Examiner* — Robert P Bullington
(74) *Attorney, Agent, or Firm* — J.T. Hollin, Attorney at Law, P.C.

(57) ABSTRACT

The "Reality Driver Education System" (RDES) combines different friction surfaces of an outdoor driving training area which extends a minimal length of 600 feet, and further comprises waterjet hazards and computer-generated, "augmented reality" images. RDES may be performed with the actual personal vehicle owned by driver or used in his/her employment. Several field devices and sensors integral to the training area send signals to a portable computer, which generate a variety of augmented and real driving hazards, including "water curtains," to a head-mounted display worn by the driver. The driver/trainee drives the vehicle through various stages and simulations, thus exposing him/her to challenging emergency situations. Failing to perform proper maneuvers will likely result in losing control of the vehicle and probable spin-outs or sliding. Applying adequate steering, braking, and/or acceleration corrections will result in successful execution of each scenario.

10 Claims, 10 Drawing Sheets

DRIVER EDUCATION SYSTEM AND METHOD FOR TRAINING IN SIMULATED ROAD EMERGENCIES

CROSS-REFERENCES TO RELATED APPLICATIONS

This is a continuation-in-part patent application which claims the benefit and priority of parent U.S. Published patent application Ser. No. 14/699,028 filed on Apr. 29, 2015, and currently co-pending before the USPTO, by reference as though said parent application Ser. No. 14/699,028 appears fully herein.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The inventive concept disclosed, referred to as the "Reality Driving Education System" (RDES), is, in a very general sense, related to a variety of equipment and methods for training drivers of motor vehicles.

It is very difficult to train drivers (trainees) so as to give them experience in encountering hazardous road conditions without also compromising the safety of the driver. Examples of such hazardous road conditions may include slippery roads, unexpectedly appearing obstacles, overspeeding on sharp turns, etc. As shown in the disclosures, training by means of simulating these conditions while the driver is operating the vehicle generally addresses the above issues. An important concept of this inventive concept is that it allows for a trainee to undergo the training while driving his/her own vehicle.

A variety of prior art driver training methods attempted different types of simulation of such driving experiences. These methods broadly fall into two categories: (1) modifications of stock vehicles to simulate hazardous road conditions, and (2) complete computer-based simulated driving environments which do not usually involve an actual vehicle but a mechanical, computerized simulator.

Modifications of stock vehicles usually calls fora dedicated vehicle to be used only for training, which cannot be otherwise used for driving under actual real-life driving situations. Simulation of the hazardous road conditions in such dedicated high-performance vehicles usually provides realistic haptic and motion feedback, while the spectrum of simulated experiences is limited mostly to the inducement of tire skids.

Computer-based simulated driving environments, while providing the most effective training benefits, require a dedicated and continuously maintained floor space. They also frequently require a detailed, realistic car cabin to be used in order to achieve a high enough degree of realism of the simulation. When the kind of training vehicle needs to be changed, the changeover usually calls for a cabin replacement, which is very costly and time consuming. An important consideration is the fact that neither of the above-described driver training methods (1), (2) allow a driver to obtain the obvious advantage of training conducted while driving his/her own vehicle.

For these reasons, the present inventive concept addresses the need to provide the sensation of mobility and the realistic feel of driving an actual vehicle while not exposing the driver to the dangers of an actual hazardous road situation during training. In the preferred embodiment, the disclosed driving trainer course is laid out over an area roughly the size of two football fields laid end-to-end. The system of the present inventive concept may also be quickly set-up and used on a hard-surfaced parking lot.

(2) Description of the Related Art, Including Information Disclosed Under 37 CFR 1.97 and 1.98

US Published Patent Application #2014/0358430 A1 (Dec. 4, 2014; A system for evaluating driver performance comprising: a GPS (Global Positioning System) navigation module for locating a vehicle driven by a driver; a running vehicle data collection module for collecting data of the vehicle; a vehicle specifications memory for storing specifications of the vehicle; a road maps memory for storing a plurality of maps of an area so as to identify the location of the vehicle by cooperating with the GPS navigation module; a road evaluation parameters memory for storing road evaluation parameters of the vehicle, and outputting a plurality of evaluation parameters of the vehicle by cooperating with the road maps memory.

US Published Patent Application #2014/0005135 (Apr. 3, 2014). Portable simulation system is a computer-based driving simulator, which uses an actual vehicle as an input device, and a portable display to present a Virtual Driving Environment (VDE) to the driver. Vehicle's steered wheels are placed atop of the turntables permitting free operation of the steering wheel. The vehicle remains immobile while its engine and power steering can be turned off during the simulation. External non-invasive sensors can be placed under the gas and brake pedals, permitting any vehicle to be used in the simulator, including the drivel's own vehicle. A digital interface to the vehicles systems, like OBD II, can be used to increase the fidelity of the simulation.

US Published Patent Application #2013/0142385 (Jun. 6, 2013). A method to display a ghosting image upon a transparent windscreen head-up display in a vehicle includes monitoring an operating environment of the vehicle, monitoring a driver registration input, determining a registered desired location graphic illustrating a future desired location for the vehicle based upon the operating environment of the vehicle and the driver registration input, and displaying the registered desired location graphic upon the head-up display.

U.S. Pat. No. 8,412,499 (Apr. 2, 2013). The portable simulation system is a computer-based driving simulator, which uses an actual vehicle as an input device, and a portable display to present a Virtual Driving Environment (VDE) to the driver. The vehicle's steered wheels are placed atop turntables permitting free operation of the steering wheel. The vehicle remains immobile while its engine and power steering can be turned off during the simulation. External non-invasive sensors can be placed under the gas and brake pedals, permitting any vehicle to be used in the simulator, including the driver's own vehicle. A digital interface to the vehicle's systems, like OBD II, can be used to increase the fidelity of the simulation. A portable computer used for driving simulation and VDE presentation provides a low cost simulation option.

U.S. Published Patent Application 42012/0196252; (Aug. 2, 2012) Disclosed is a driver training device that can be utilized to simulate the back of a moving vehicle. The training device can be utilized in a driver training program to help students learn proper distancing and how to avoid dangerous tailgating practices. A device can include a driver training apparatus comprising a taillight assembly that includes brake lights and/or other features to simulate the back of a moving vehicle. A training device can simulate the back of one or two vehicles, and can be powered by attachment to a lead vehicle or alternatively to a movable track.

US Published Patent Application #2011/0254655 A1 (Oct. 20, 2011) The invention is a method and system for monitoring, and controlling driver performance in a controlled driving environment. A portable information device is provided to a driver who registers with a server computer for controlling vehicle operation in the driving environment. A record for the driver is stored in a database associated with the server computer. The driver's performance is monitored in the controlled driving environment and each driving violation that occurs is determined.

US Published Patent Application #2009/0028639 (Jan. 29, 2009). Disclosed is a driver training device that facilitates practicing vehicle maneuverability tasks to help develop vehicle maneuverability skills. In one embodiment, the device includes a plurality of boundary markers interconnected by flexible connecting members. The flexible connecting members are movable from first positions wherein the boundary markers are in a compact arrangement, to second positions wherein the boundary markers are located in a predetermined arrangement and spacing that facilitates practicing a vehicle maneuverability task.

U.S. Pat. No. 7,246,050 (Jul. 17, 2007) This invention provides in a safe and effective manner the experience of observing potential collision obstacles or other hazard images to the human operator of an otherwise conventional vehicle, (such as an automobile or aircraft) moving in a normal manner in a natural environment (such as an outdoor test track). The invention incorporates in addition to the mobile vehicle, computer-based image generation devices, and position, velocity, acceleration, measurement instruments to enable the simulated visual hazard images, including operator perception of and response to those hazard images. Making the actual moving vehicle part of the simulated hazard encounter means the vestibular (motion) cues and visual cues of the natural environment are very realistic, while only the computer-generated hazard images imposed on the natural environment view are virtual.

U.S. Pat. No. 4,121,356 (Oct. 24, 1978) An installation for affording a motor vehicle driver practice to improve his reactions and behavior in an emergency situation. A shaft with a movably disposed symbol-bearing member therein is arranged in a test-roadway. Operating devices are provided for moving the symbol-bearing member partway out of the shaft and for completely returning the symbol-bearing member to within the shaft. An electric signal is produced by a device disposed in front of the shaft to control the operating devices when a motor vehicle approaches the shaft. The symbol-bearing member is suddenly caused to move out of the shaft when a motor vehicle approaches the shaft and returned before the vehicle reaches the symbol-bearing member.

WO9624918 (Aug. 15, 1996); A facility including a vehicle driving surface with at least one portion covered with a slippery coating periodically sprayed with water, said surface having at least one movable obstacle that is controlled to move onto the driving surface when the vehicle thereon is sensed. At least the portion of the driving surface that is provided with a slippery coating and the movable obstacle includes a series of magnetic resonance or inductive loop sensors connected to a computer for continuously supplying vehicle position and vehicle velocity data thereto.

BRIEF SUMMARY OF THE INVENTION

The "Reality Driving Education System" 1 combines specifically prepared surfaces of an outdoor driving road course extending a length of minimally, 600 feet, further equipped with waterjet hazards and computer-generated, "augmented reality" images. In the preferred embodiment, this system is used in instances where the actual vehicle operated by the trainee is the exact same vehicle regularly used in the trainee's employment. An active training zone 15 comprises low friction sectors 18 each of which is simultaneously exposed to augmented reality images 33 and instantaneous production of simulated hazards.

Several training devices integral to the road course and its prepared surfaces send signals to a portable display, thereby presenting a variety of augmented driving environments to the driver. The trainee (driver, student) will drive his/her vehicle through various stages and simulations, thus exposing the driver to challenging road situations. At least one hazardous condition simulation will be available per each drive through the active training one. Failing to perform appropriate maneuvers will result in losing control of the vehicle and probable spins or "slide-outs." Applying adequate steering, braking, and/or acceleration corrections will result in successful execution of each driving simulation.

The disclosed system will provide a safe learning environment for drivers to learn and practice proper emergency driving techniques. Another advantage of the RDES 1 is that the disclosed system will teach student drivers/trainees the extreme importance of staying focused on their driving environment. Any distractions, such as munching on food, conversation with passengers, cell phone operation, etc. w ill decrease the available time a driver has to react to hazards. The system will help trainees avoid accidents in critical situations and hazardous road conditions.

DETAILED DESCRIPTION OF THE INVENTIVE CONCEPT

The objects, features, and advantages of the concept presented in this application are more readily understood when referring to the accompanying drawings. The drawings, totaling eleven figures, show the basic components of the system and the methods of use. In the several figures, like reference numbers are used in each figure to correspond to the same component as may be depicted in other figures.

Figure 1:
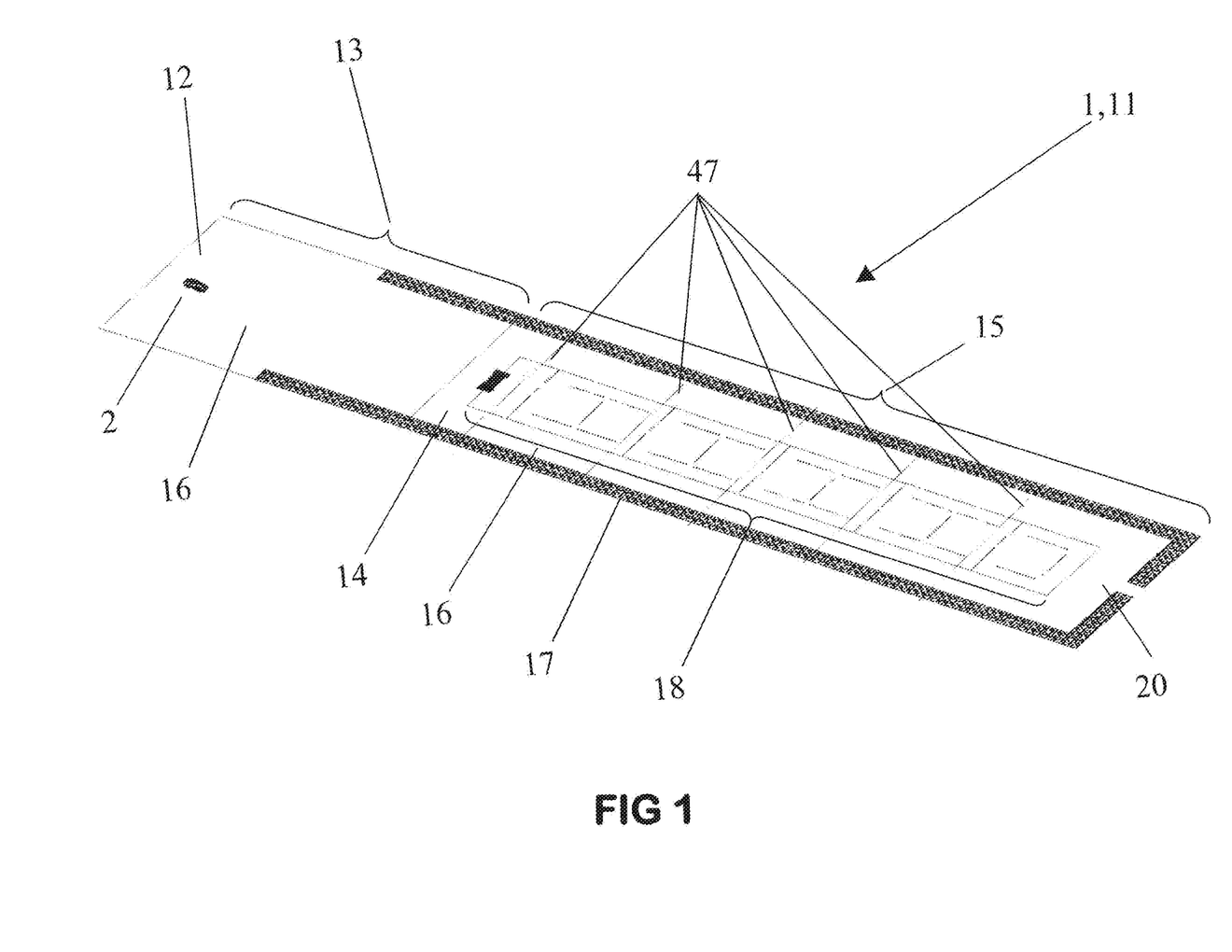
FIG. 1 illustrates the physical lay out of the Reality Driving Education System 1, showing the various sectors and components of the training area 11.

The discussion of the present inventive concept will be initiated with FIG. 1, which illustrates the general physical layout and training area 11 of the Reality Driving Education System (RDES) 1. The system includes an acceleration zone 13, an "active training zone" 15, a "standard friction" zone 16, a safety zone 17, and a "low friction" zone 18. In the preferred embodiment, the RDES 1 is constructed outdoors on relatively level ground. Other embodiments of RDES 1 may be constructed on areas of sloping terrain to simulate uphill/downhill driving conditions.

The preferred embodiment of RDES 1 comprises dimensions of, minimally, six-hundred (600.0) feet in length and eighty (80.0) feet wide. Smaller, temporary embodiments of RDES 1 may be installed in a relatively short time (24 to 48 hours) on existing parking lots or other hard-surfaced areas commonly driven on by the public. In the preferred embodiment the RDES 1 is constructed and installed atop natural earth. As shown in FIG. 1, an acceleration zone 13 comprises about one-third of the RDES length and an "active" training zone 15 occupies the remaining two-thirds of the training area 11.

In FIG. 1, a vehicle 2 is depicted at the vehicle starting position 12 in preparation for a driving session through the training area 11. RDES 1 course operator 31 (not in view) may be provided for the purpose of (a) coordinating and managing a variety of field devices installed in the active training zone 15 and (b) helping the driver 3 prepare for and understand the types of driver training simulations to be executed. A primary objective of this inventive concept is to reliably and accurately reproduce or replicate an exact training scenario in instances where a driver needs multiple exposures to a hazard in order to become proficient in handling the vehicle.

When referring to the concept of "friction" in the layout and operation of RDES 1, the terms in this disclosure are derived from the American Society for resting and Materials ("ASTM," currently called ASTM International). In particular, ASTM International has published a *Standard Test Method for Skid Resistance of Paved Surfaces Using a Full-Scale Tire* [Designation: E 274-06]. This Test Method utilizes measurements representing "the steady-state friction force on a locked test wheel as it is dragged over a wetted pavement surface under constant load and at a constant speed while its major plane is parallel to its direction of motion and perpendicular to the pavement." Test Method, paragraph 1.2

Under the "Test Method, standards, the skid resistance of a paved surface is determined from the resulting force or torque record and reported as skid number (SN)." Test Method, para. 3.3. When water is applied to the surface of the active training zone 15, the skid number (SN) will be lowered, resulting in a "low friction zone" 18 as shown in FIG. 1. Other standards relating to friction of the roadway surfaces of this inventive concept are obtained from a publication, *Discussion on Skid Resistance of Pavement Surfaces*: author, Rolands L. Rizenbergs, Kentucky Department of Highways (1968). The skid resistance properties of concrete pavement are affected by surface texturing.

Water on the surface of a pavement structure will have a deteriorative effect on the skid resistance, or friction, of that surface. In that light, the active training zone 15 comprises an innermost roadway having several "low friction" sectors 18. The low friction sectors in the RDES 1 correspond to a substantial diminishment of the skid resistance encountered by the tires of a vehicle when driven upon the low friction sectors 18. Bordering the innermost roadway is an outer roadway "standard friction" control zone 16 which, in the preferred embodiment, is a dry concrete surface having a relatively high skid number (SN).

Further, the low friction sectors 18 are also the setting where the RDES 1 generates augmented reality images 33 to the vehicle 2, by means of the onboard vehicle control unit 56 and simulated hazards. Rather than using concrete surfacing, a commercially available smooth-surfaced composite layer or other material may be used in the low friction sectors 18 of the active training zone 15. Also installed in the active training zone 15 is an extensive water jets sector 22 comprising strategically-arranged, quick acting solenoid vales 43 and water supply lines 41, 42 (more clearly shown in FIG. 6 and FIG. 7).

The low-friction sectors 18 and the water jets sector 22 in the innermost roadway are enveloped by a "standard friction" control zone 16. The standard friction control zone 16 comprises dry concrete, which characteristically exhibits a high degree of skid resistance properties. The standard friction control zone 16 allows a driver to stop safely or regain control over the vehicle 2 in the event driving through any of the low friction sectors 18 causes sliding or spinout of the vehicle 2. Further, the standard friction control zone 16 comprises the acceleration zone 13 and the exit end 20 of the RDES 1.

Again referring to FIG. 1, to provide ultimate safety, the standard friction control zone 16 is bounded its entire length by a surface entitled a "safety" zone 17. The safety zone 17 is, in the preferred embodiment, composed of a deep layer of gravel (or similar materials used on professional automotive race tracks) to stop a vehicle 2 safely in the event the driver 3 is unable to gain control of the vehicle 2 in the standard friction control zone 16. After the driver 3 passes the exit end 20 of the low friction sectors 18, he/she may return to the starting position 12 if necessary to repeat the same exercise or practice another sequence of training.

Figure 2:
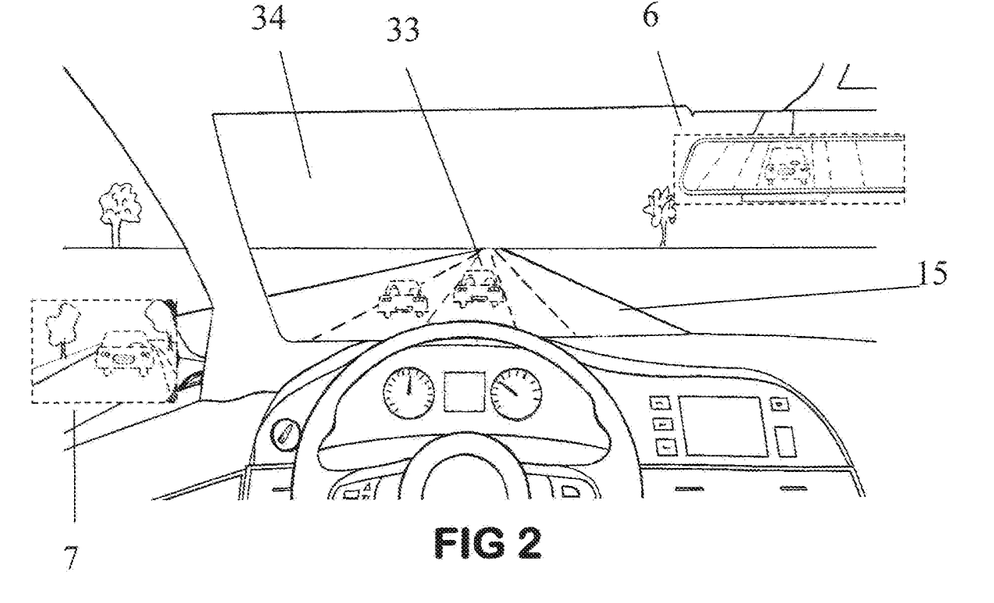
FIG. 2 illustrates the locations of real images and augmented reality 33 images that may be presented to a driver/trainee during a driving session.

FIG. 2 illustrates the combination of real images and augmented reality images 33 that may be presented to a driver 3 during his/her driving session. In the cabin of the vehicle 2, augmented reality images 33 will be presented to the driver 3 by means of the surface of the lens of a Head-Mounted Device (HMD) 4 worn by the driver 3. Simulated versions of the rear view mirror 6 and side view mirror 7 are programmed to appear on the lens surface, along with appropriate augmented reality images 33 corresponding to the training exercise being performed by the driver 3. Simulated versions of the vehicle's 2 mirrors 6, 7 will be visible to the driver 3 on the top-center, left lower one-third, and right lower one-third lens surfaces of the HMD 4. The augmented reality images 33 will generally be visible, but may not precisely overlay the actual surfaces of the mirrors 6, 7 on the vehicle 2.

Further, the windshield 34 of the vehicle 2 may receive projections of computer-generated augmented reality images 33. However, the vast majority of the windshield 34 surface allows the driver 3 unobstructed view of real objects in the training area 11, and the outer edges of the active training zone 15 (as is shown in FIG. 2).

Figure 3:
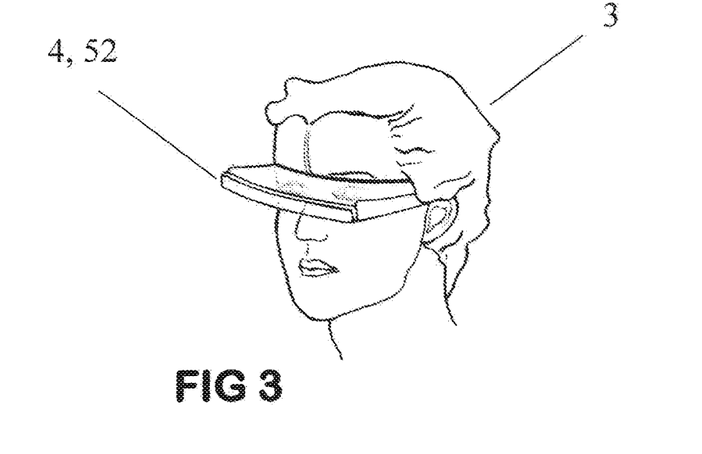
FIG. 3 depicts the orientation of the head mounted display 4 that may be worn by a driver/trainee while occupying the driver's seat of a training vehicle.
Figure 4:
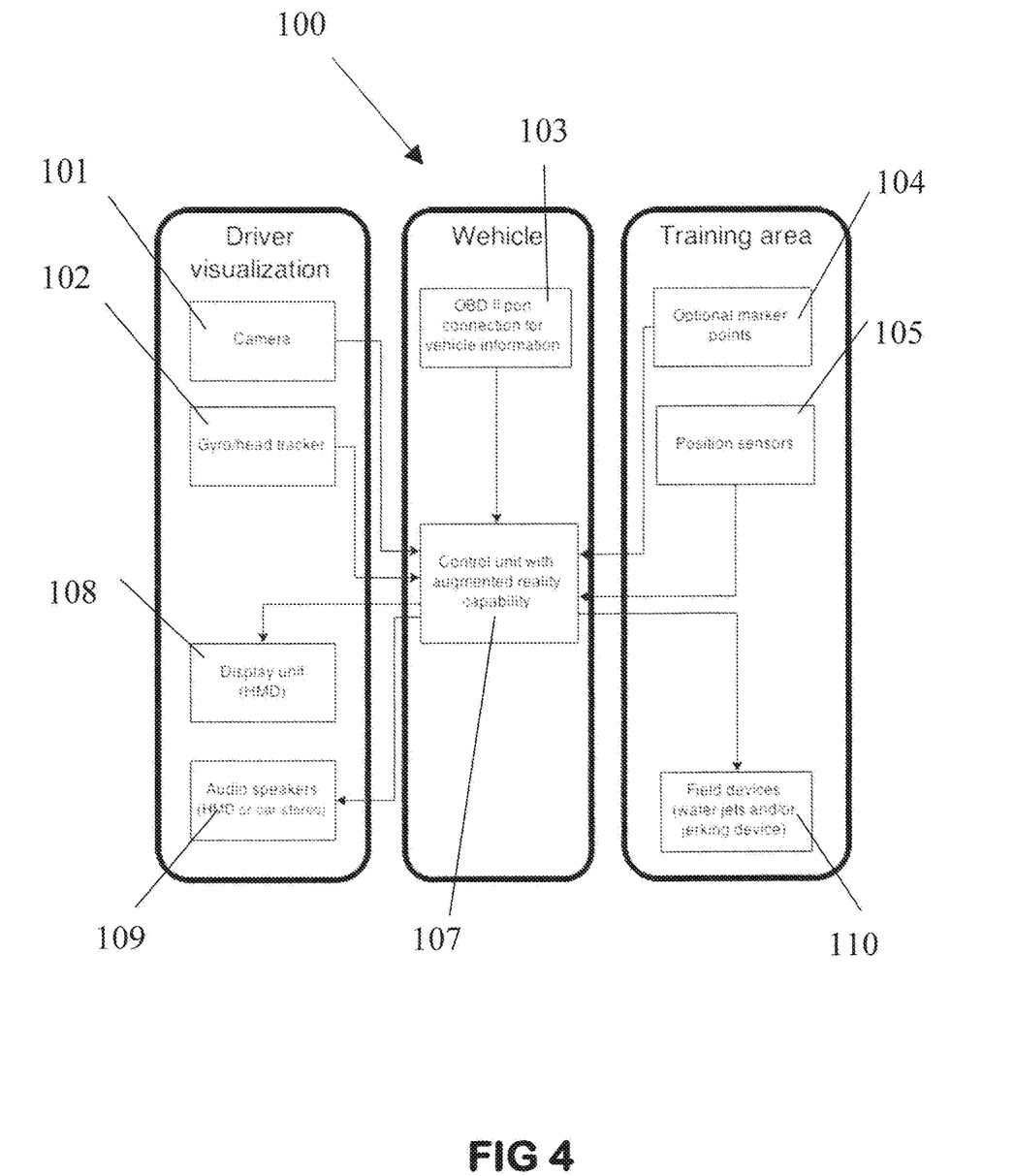
FIG. 4 is a chart displaying the interconnected relationships between (a) the sources of images delivered to the driver, (b) vehicle performance information, and (c) sensors and training devices located in the training area.

FIG. 3 depicts the orientation of the head-mounted device (HMD) 4 that may be worn by a driver/trainee 3 while occupying the driver's seat of the training vehicle 2. Some embodiments of the HMD 4 may utilize a gyro/head tracker 52 for more accurate renderings and placements of the augmented reality images 33. All HMD 4 units used in RDES 1 are currently available devices and will correspondingly, have differing technical preciseness. Examples of this field of technology include Microsoft® Holo-lens and similar products. Such devices are used to transform the RDES 1 training environment and the simulated driving conditions with the use of augmented reality techniques. FIG. 4 illustrates the interrelatedness of visual stimulations available to the driver 3, the equipment within the vehicle, and general items installed in the active training zone 15.

In the preferred embodiment, the driver 3 uses his/her own private or work vehicle to navigate the simulated driving scenarios. The vehicle 2 must have an integral onboard diagnostics jack. The vehicle may be temporarily equipped with an audio-visual system 55 controlled by a portable computer 58 which is positioned in the interior of the vehicle 2. The computer 58 functions as the RDES 1 control unit 107 while transitioning the active training zone 15. Audio stimulation will be achieved with either headphones (such headphones could be integrated into the HMD 4) or through the vehicle 2 audio system's speakers which may be connected to the control unit 107. With this combination of inputs, the driver 3 will see and hear the actual environment, simulated virtual waterjet hazards, and/or augmented reality images 33.

A micro camera 101 may be located in the training vehicle 2, proximate the driver 3 in order to capture images and send those images to the control unit 107 (laptop/portable computer 58) which is equipped with software capable of generating augmented reality images 33. Further, a gyro-head tracker 52, 102 may be used to monitor the movements and orientation of the driver's 3 head and also send this information to the control unit 107.

As can be described by reference to FIG. 4, the RDES 1 system is designed to use wireless technology or dedicated electronic networks communicating between and the training area 11, field devices and sensors, a camera 101, control unit 107, HMD 4 and other components of the RDES 1. The training area 11 may be equipped with a plurality of marker points 104 which are specific visual indicators at various points along the active training zone 15 for the benefit of the driver 3. Also included are position sensors 105 which continuously signal the vehicle 2 position to the control unit 107.

Upon receiving the plurality of inputs from the above-described components, the control unit 107 is enabled to generate augmented reality images 33 to the driver display unit 108, 52 (refer to FIG. 3 and FIG. 4) and audio signals to the vehicle audio system 109 (or headphones worn by the driver 3). The control unit 107 additionally sends appropriately timed signals to the field devices installed in the active training zone 15, which may include water solenoid valves 43, a front (or rear) axle yanking device 36, and actual waterjet hazards 46 (a-b).

Figure 5:
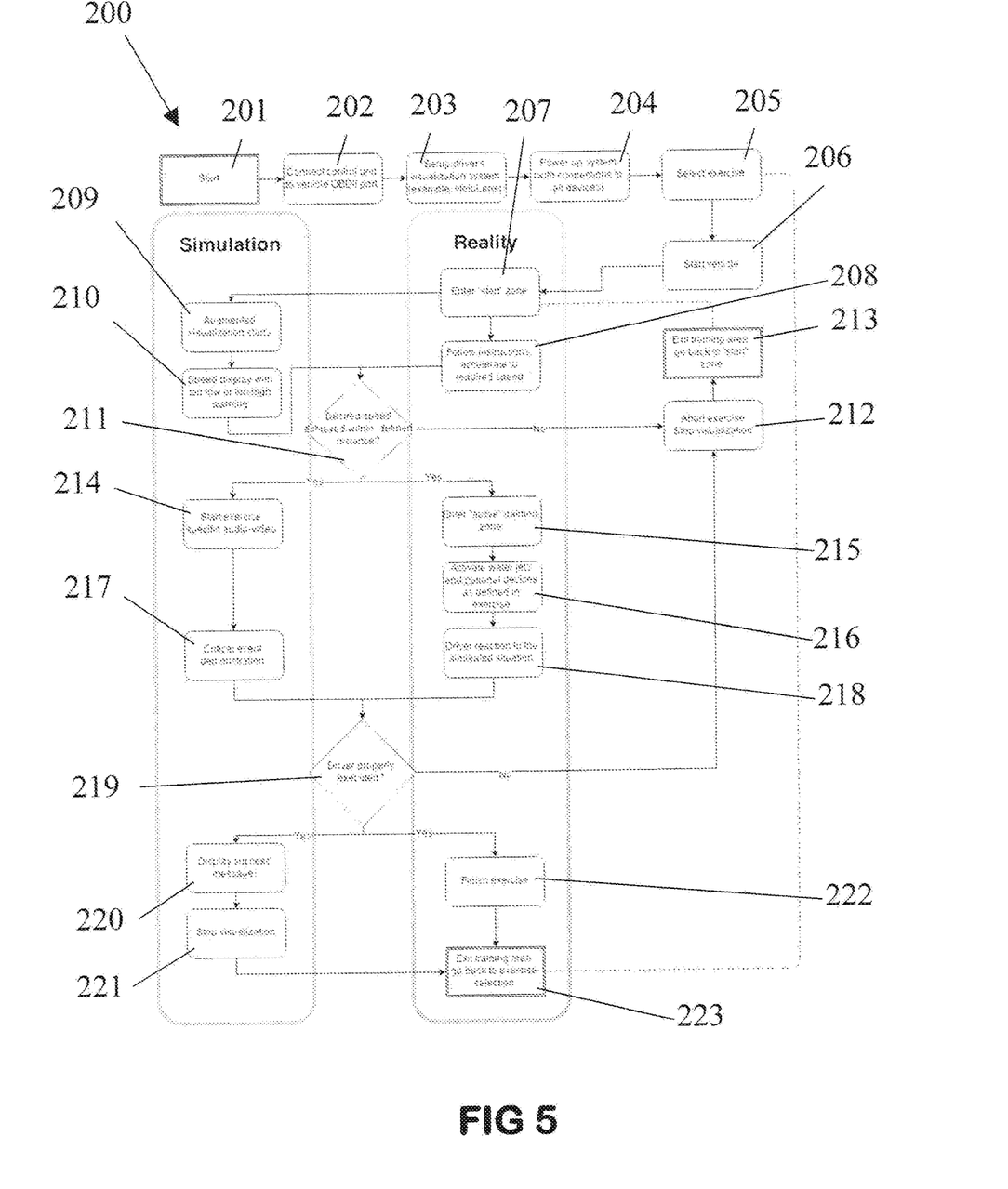
FIG. 5 is a flow chart depicting the sequence of events (200-223) a driver/trainee undergoes while maneuvering the vehicle through the active training zone 15 from start to finish.

FIG. 5 presents a flow chart 200 showing the sequence of events a driver 3 or trainee undergoes while maneuvering the vehicle through the active training zone 15. The training sequence is initiated at a start sequence 201 convenient for the driver 3 and a course operator 31 At this point, the RDES 1 control unit 107 is connected to the On-Board Diagnostics (OBD) 53 port of the vehicle 2. In the next sequence 203, a RDES 1 course operator 31 sets up the driver's 3 visualization system which, in the preferred embodiment, will be a head-mounted display (HMD) 4, or other electronic device capable of being used as a visual display of computer-generated graphics.

The course operator 31 helps the driver/trainee 3 with the operation of the HMD 4, vehicle 2 OBD 53 plug-in, control unit 107 placement and setup, and helps to select a desired training exercise. The foregoing matters are all accomplished before the driver 3 enters the training area 11. Once the RDES 1 system is deemed to be fully functional by the course operator 31 and driver 3 indicates he/she is ready (exercise selected, audio/video tested) then the driver 3 drives the vehicle to the vehicle starting position 12. Communications is then established 204 to all vehicle 2 training equipment and the field devices located in the active training zone 15. The training exercise has previously been agreed upon and selected. Once in position, the lens or screen of the HMD 4 will receive projections of instructions which will guide the driver 3. For example "steer straight ahead," "speed up to xx mph," are typical messages/instructions to be transmitted to the driver/trainee 3.

The driver 3, having entered the vehicle 2 places his/her head mounted display 4 in a comfortable position, allowing freedom movement of the eyes for scanning the lens and/or screen of the HMD 4. The vehicle's 3 engine is then started 206. In the next sequence 207 the driver 3 maneuvers his/her vehicle to the starting position 12. Following the instructions 208 displayed on the HMD 4, the driver 3 accelerates the vehicle 2, in the acceleration zone 13, to the speed required by the selected training exercise. While the driver 3 is achieving desired speed for the exercise, the control unit 107 activates and starts augmented reality generators which are synchronized with vehicle 2 position and speed in the active training zone 15.

A digital interface to the vehicle's 2 systems, particularly the OBD II 53, can be used to increase the accuracy of the overlay of the virtual simulation. Immediately following vehicle speed stabilization in the acceleration zone 13, the driver 3 crosses the entry zone 14 into the active training zone 15. There is no further action required by the course operator 31 at this point. The RDES 1, since it has been pre-programmed, automatically activates the augmented visualization imaging 209 appropriate to the exercise. The vehicle's 2 location and speed will trigger augmented reality "components" for display to the driver 3.

If the vehicle 2 speed is improper for the training exercise, (the control unit 107 will determine if the vehicle 2 has reached the desired speed 211 within the acceleration zone 13), the control unit 107 will abort the exercise. In this event, communication will immediately be sent to the driver 3 through an on-screen HMD 4 message to abort the exercise 212, and the augmented reality images 33 will also be terminated. The vehicle's 2 speed indication is part of the visualization displayed on the HMD 4 and the driver 3 sill be warned for too high or too low a speed (or for being off-course). If no correction is made within the available time and space allowed for the training, the exercise will automatically be aborted. No action from the course operator 31 will be required. The driver 3 must then exit the active training area 15 at the exit end 20 and drive the vehicle 2 back to the starting position 12, 213.

Again referring to FIG. 5, if the vehicle 2 speed attained in the acceleration zone 13 is proper for the training exercise, the control unit 107 will begin an exercise-specific video 214. Position sensors 105 inside the active training zone 15 will continuously relay the position of the vehicle 2 to the control unit 107 which then synchronizes the generation of augmented reality images 33 and the audio presentations to the driver's 3 HMD 4.

Assuming the vehicle 2 speed is appropriate, the driver 3 will pass the entry zone 14 and the vehicle 2 enters the active training area 15. Based on the program selected, the control unit 107 activates at least one of the field devices designated for the specific training exercise 216 to be performed by the driver 3. A hazardous or critical situation is presented 217 to the driver, essentially by means of the augmented reality images 33 instantly displayed, by means of the driver's 3 HMD 4, or in the rear view mirror 6, and in the side mirror(s) 7. The mirrors 6, 7, will continuously form realistic rear view visualizations of the actual and simulated images presented to the driver 3. However the images may not precisely overlay the actual mirrors surface of the vehicle 2. The driver 3 is forced to immediately react to the presented danger through the augmented reality images 33 as his/her instincts demand 218.

Again referring to FIG. 5, a determination is made as to whether the driver 3 properly executed an acceptable maneuver to avoid the hazardous or critical situation 219. If the active training zone 15 position sensors 105, vehicle speed, and other automatic inputs indicate that the driver 3 failed to maintain proper control of the vehicle 2 during the hazardous or critical situation, the exercise is automatically aborted 212. However, if there are indications that the driver 3 properly executed an avoidance maneuver with the vehicle 2, then a "successful" message is displayed 220. The generation of augmented reality images is terminated 221, and the exercise is completed 222. The driver 3 then exits the active training zone 15 and the course operator 31 gives new directions to the driver 3 for the performance of the next training maneuver 223, if any.

To add to the feeling of realism during driver training, "water curtains" 46, 46(*a*), 46(*b*) are vertically emitted by in-ground water nozzles (or jets) 44, which are controlled by quick-acting solenoid valves 43. FIGS. 8, 9, 10, and 11 approximately portray the operation of the water curtains 46, 46(*a*), 46(*b*). The instantaneous generation of these water curtains 46, 46(*a*), 46(*b*) gives a sensation of the vehicle 2 colliding with an actual object when the driver 3 misnavigates one of the exercises designed for the active training zone 15. The water curtains 46, 46(*a*), 46(*b*) are generated by the activation of quick-acting solenoid valves 43 and water jets 44 strategically arrayed in a water jets sector 22 of the active training zone 15. By use of the term "strategically," the function of the design and array of the solenoid valves 43 and water jets 44 is understood to be arranged such as to form simulated obstacles (water curtains) generally parallel to, or perpendicular to, the course of the vehicle 2 when the driver 3 transitions through the active training zone 15.

Figure 6:
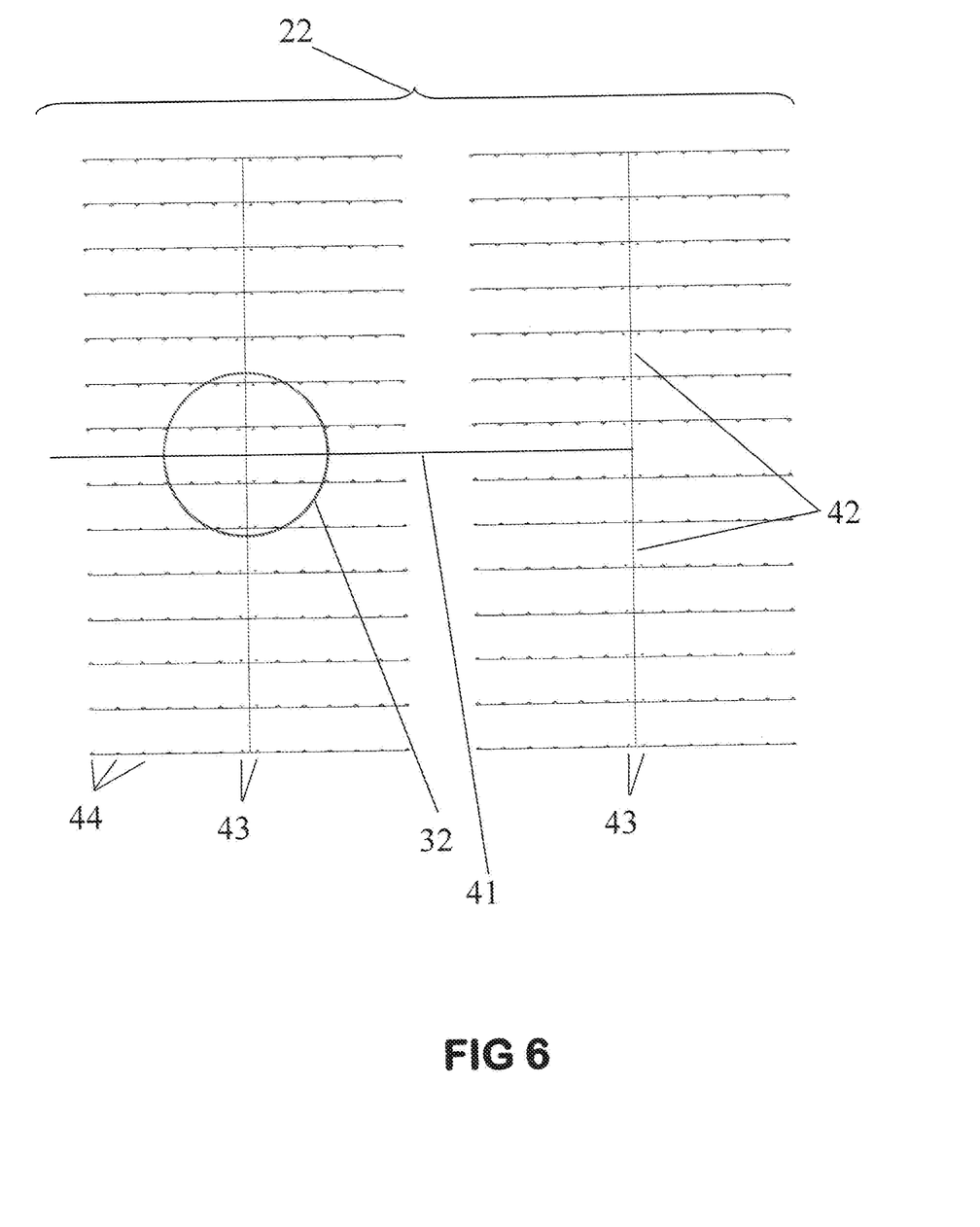
FIG. 6 is a stylized rendering of the layout of the water jets sector 22, comprising strategically-arranged water supply lines 41, 42 quick acting solenoid valves 43 and water nozzles, or jets 44.
Figure 7:
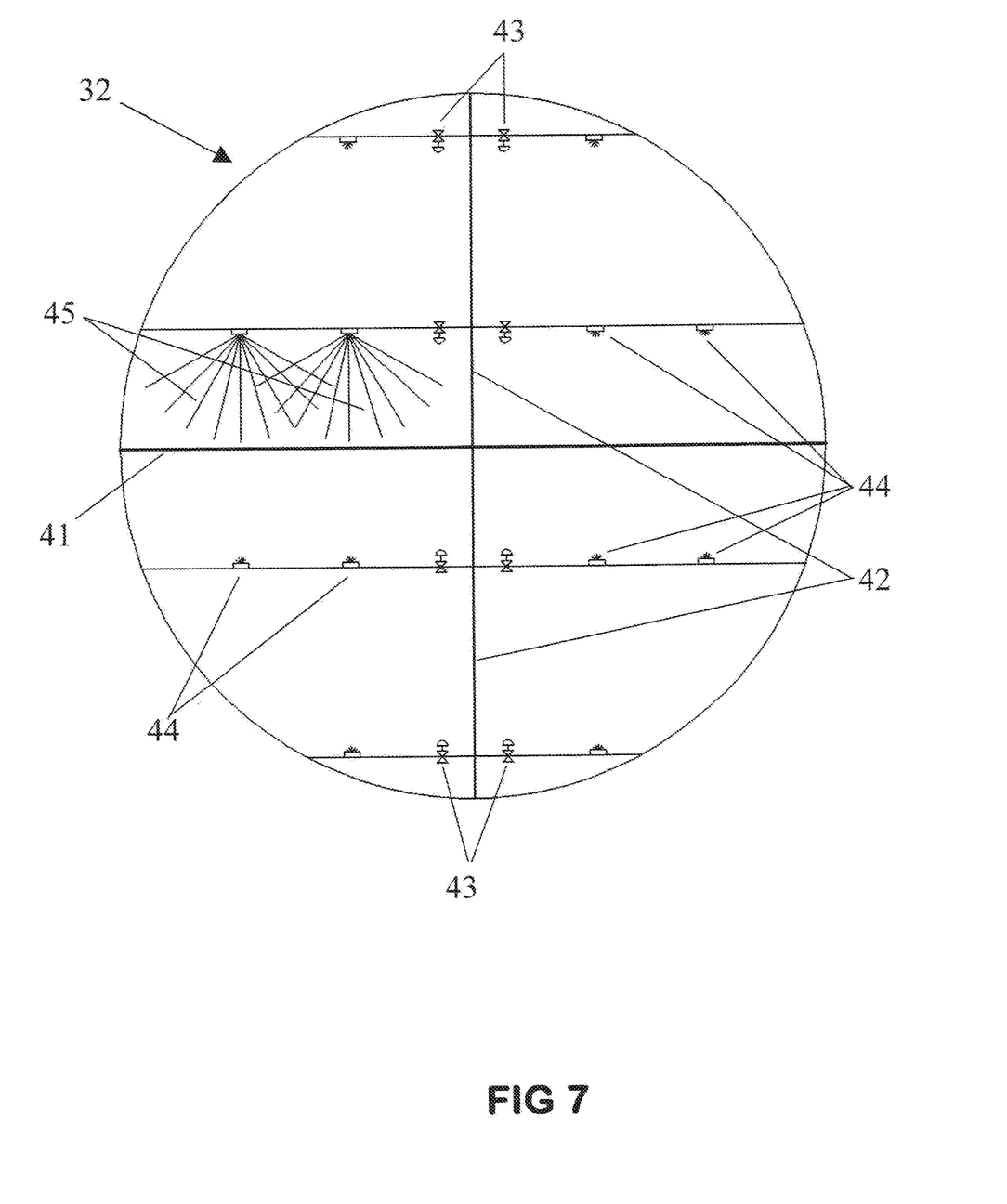
FIG. 7 depicts the magnification of the inset portion 32 of the water jets sector 22 shown in FIG. 6, further showing emission of water streams 45.

FIG. 6 presents a portion of the water jets sector 22, further showing a main water supply line 41, secondary water lines 42, solenoid valves 43, and water jets (or nozzles) 44. In FIG. 7 there is displayed a magnification of the inset 32 portion shown in FIG. 6, showing in greater detail the main water supply line 41, secondary water lines 42, solenoid valves 43, and water jets 44. Also shown in FIG. 7, for illustrative purposes only, are two illustrations of vertically ejected water streams 45 emitted from two of the water jets 44.

Figure 8:
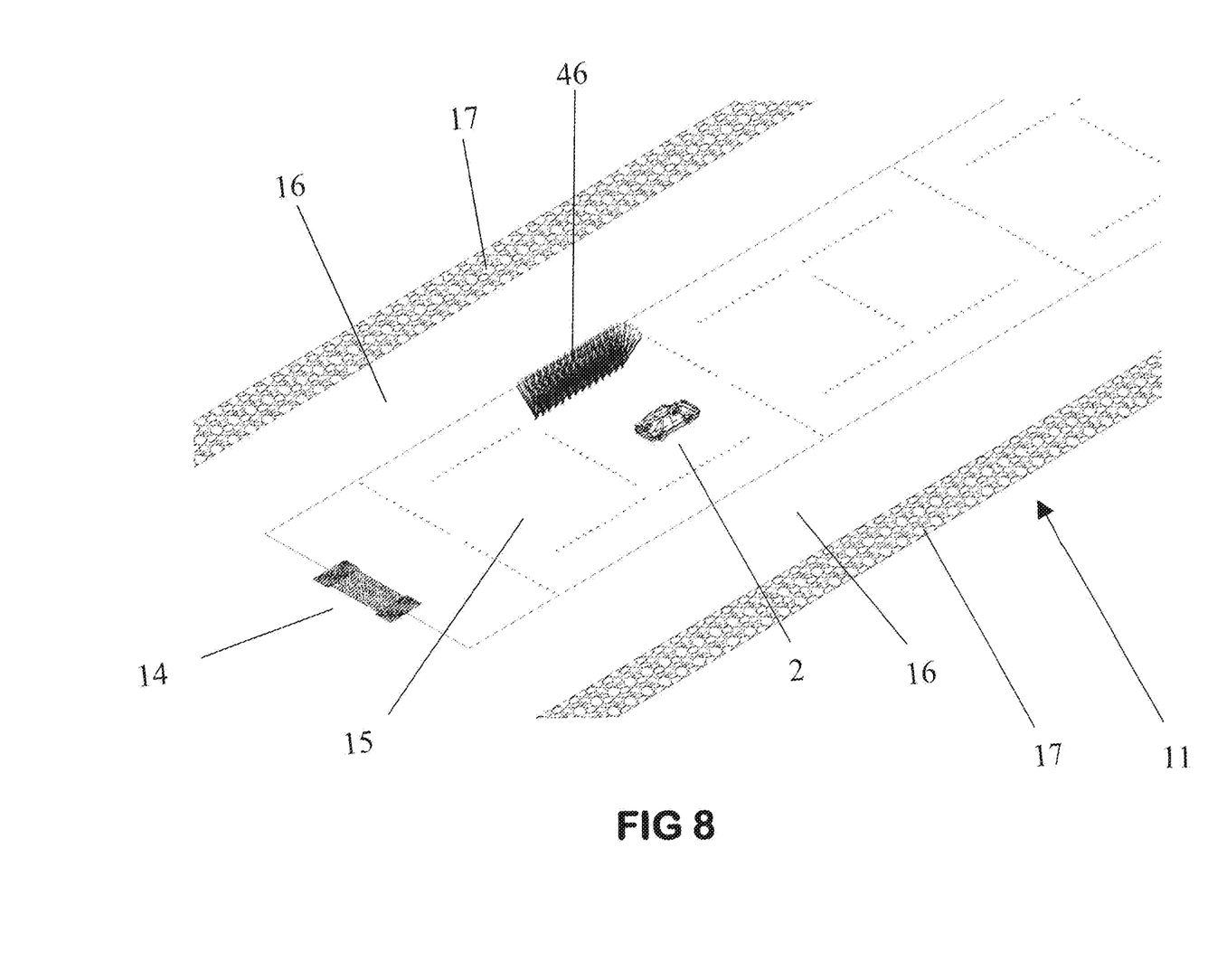
FIG. 8 shows a vehicle 2 passing abeam a sequenced eruption of a water curtain 46 from adjacent water nozzles 5 (jets), thereby simulating a road hazard.

Reviewing additional details of the RDES 1, FIG. 8 displays a vehicle 2 shortly after passing the entry zone 14 of the active training zone 15 and entering the water jets sector 22. In accordance with the training exercise to be undergone by the vehicle 2 shown, a water curtain 46 has been activated to the left of the vehicle. The water curtain 46 could represent a nearby moving vehicle, a fixed obstacle, a hazardous road condition, or other critical matter that the driver 3 is made aware of.

Figure 9:
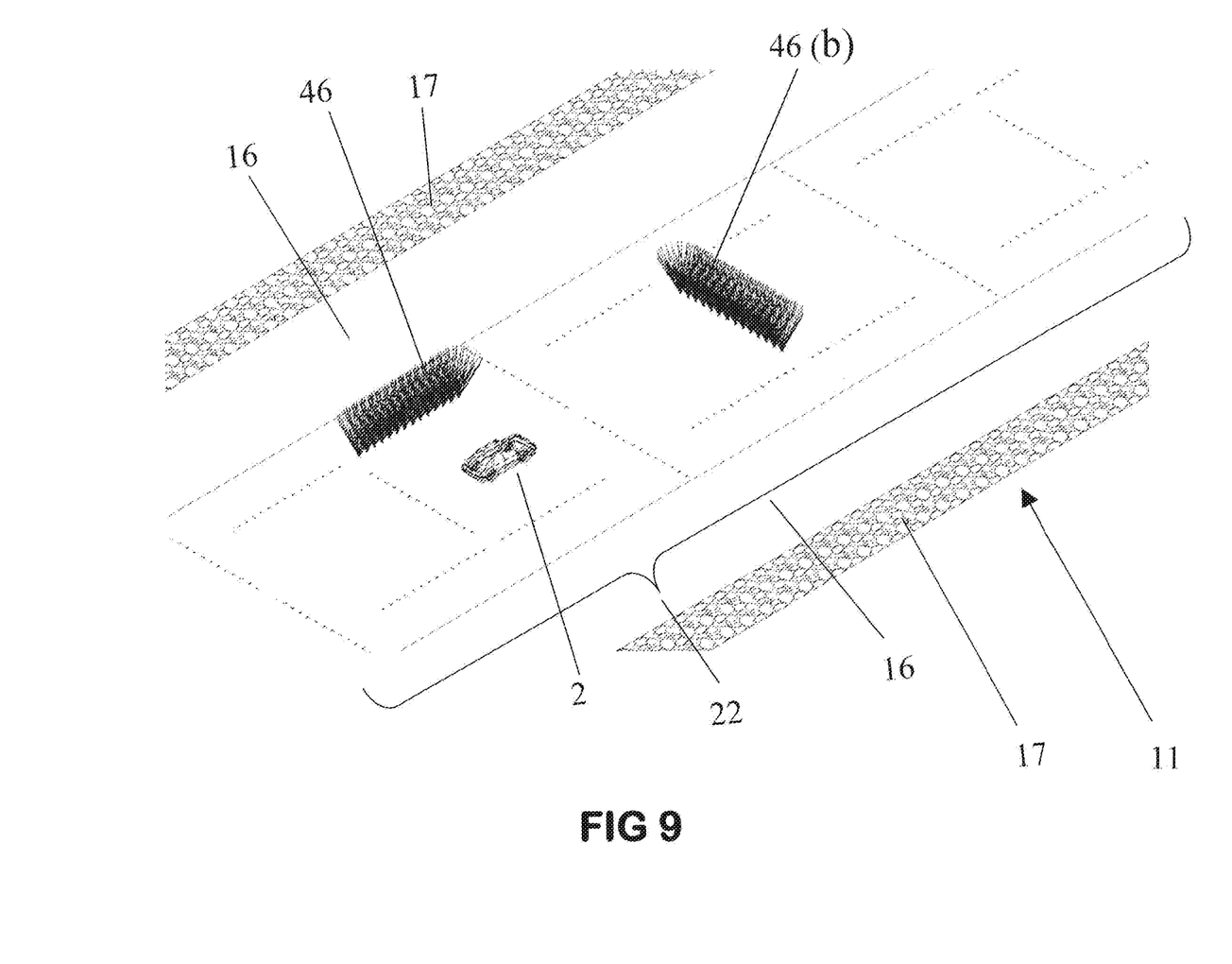
FIG. 9 depicts a vehicle 2 passing abeam a sequenced eruption of a water curtain and approaching a second water curtain 46(b) which simulates an impending obstacle.

Continuing in this scenario, FIG. 9 displays a situation in which the driver 3 of the vehicle 2 is suddenly confronted with a water curtain 46(*b*) simulating a hazardous road condition or obstacle directly in the projected path of the vehicle 2. In all likelihood, the water curtain 46(*b*) has been activated in conjunction with the simultaneous generation of augmented reality images 33, which images reinforce the visual sensation of the actual existence of the hazard in the exact position of the water curtain 46(*b*).

Figure 10:
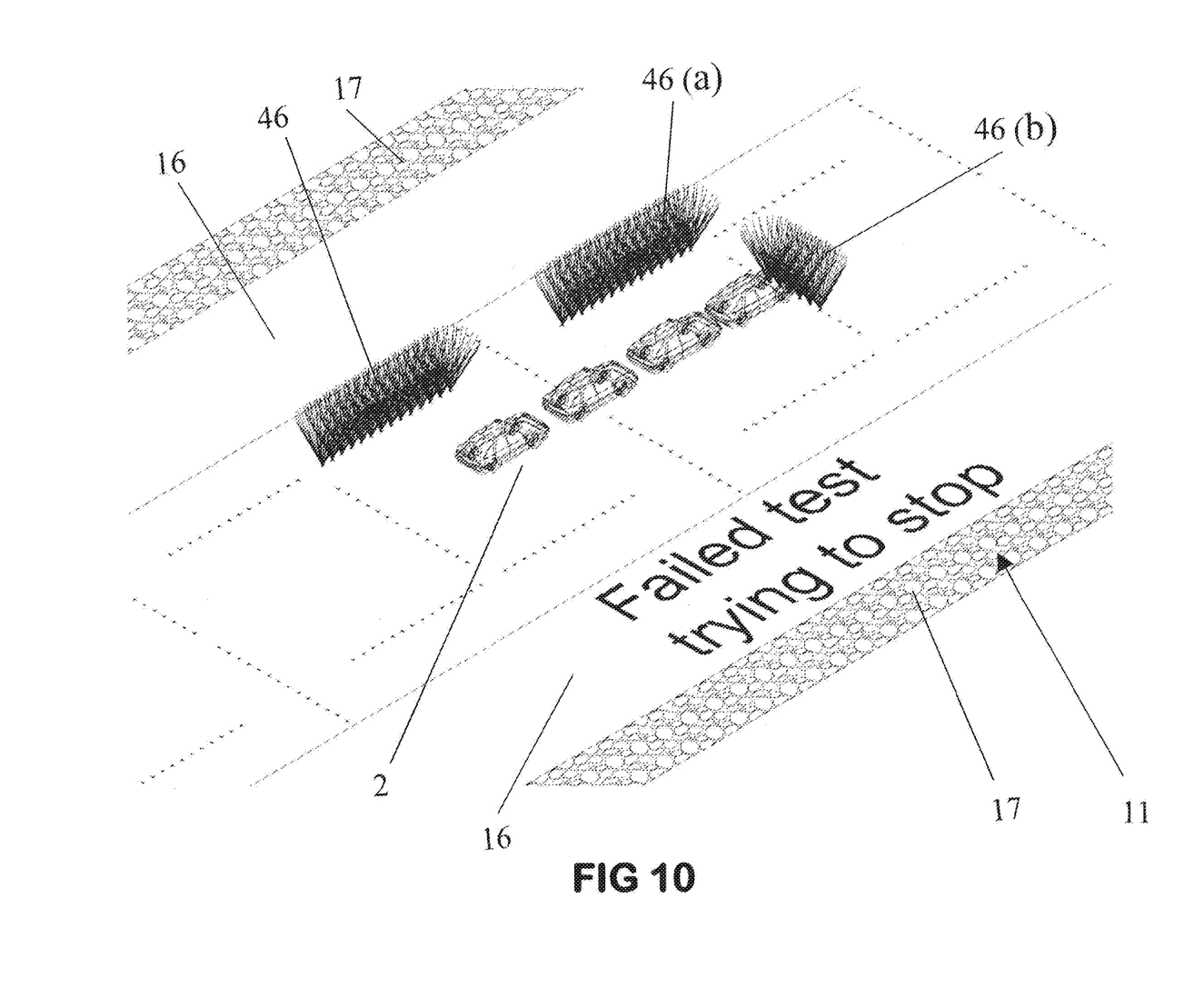
FIG. 10 illustrates the sequential movement of a vehicle 2 which has failed to stop prior to encountering a head-on simulated obstacle, the obstacle having been enhanced by coordinated eruption of a water curtain 46(b).

As the above-described driving scenario develops, FIG. 10 illustrates the efforts of the driver 3 in applying the brakes of the vehicle 2 and attempting to stop prior to colliding with the hazard represented by the water curtain 46(*b*). The driver 3 had no safe option to steer to the left around the water curtain/hazard 46(*b*), as a second water curtain 46(*a*) representing a continuation of the hazard to the left of the vehicle 2, is synchronized to be apparent to the left of the vehicle 2. The second curtain 46(*a*) could easily be enhanced in the HMD 4 (by augmented reality images 33) as an oncoming vehicle in the adjacent lane or continuous opposite-direction traffic. As a result of the driver's 3 simulated collision with the obstacle represented by the water curtain 46(*b*), the driver 3 must exit the active training zone 15 and return to the vehicle starting position 12 for another training session.

Figure 11:
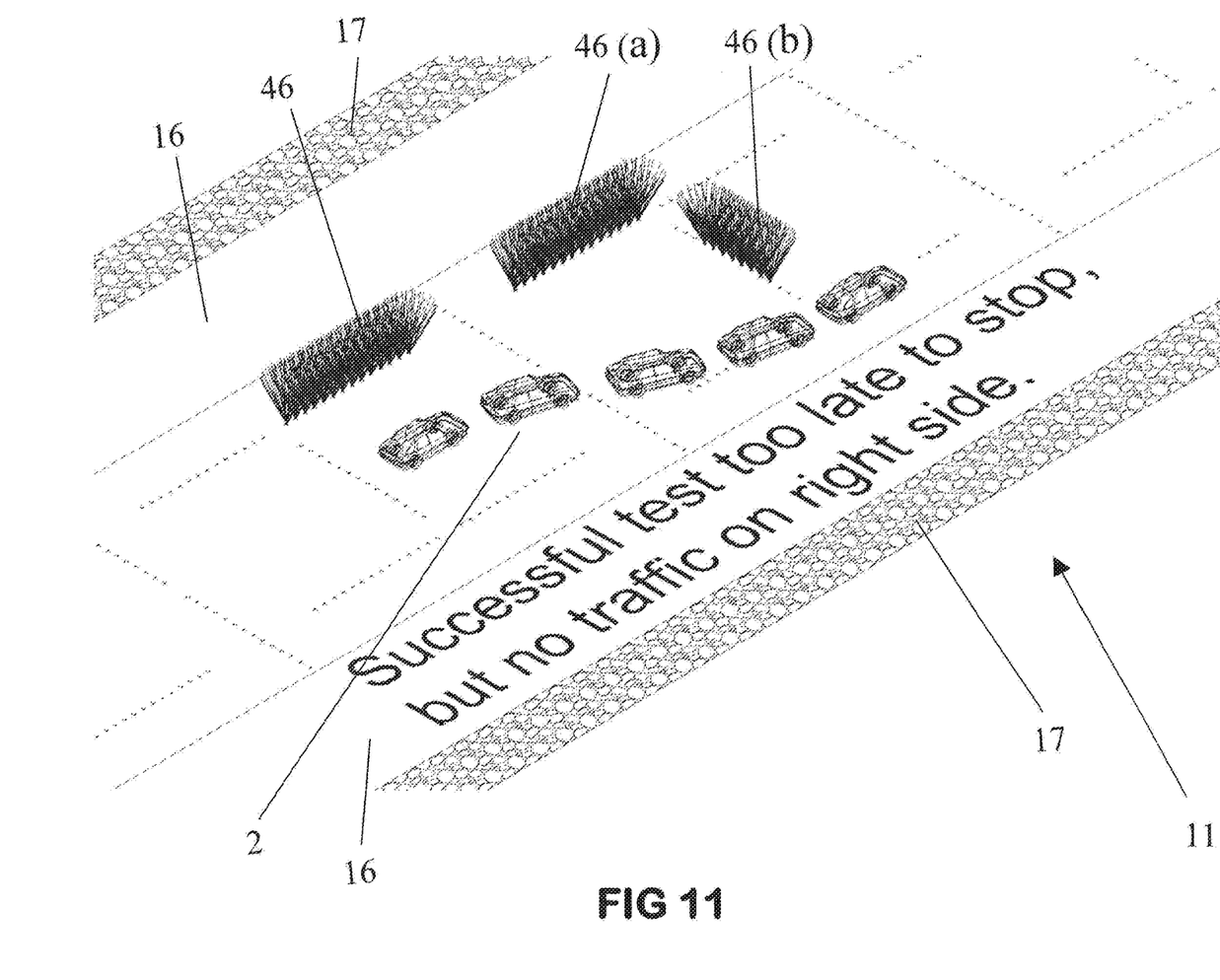
FIG. 11 depicts the sequential movement of a training vehicle 2 successfully maneuvering to avoid a head-on collision with a water curtain 46(b)-enhanced simulated obstacle.

FIG. 11 presents a situation where the driver 3 of the vehicle 2 has successfully executed a maneuver, probably a combination of braking and steering to the right, (as there is no simulated danger on the right side of the course), in order to avoid colliding with the obstacle represented by water curtain 46(*b*). The training scenarios illustrated by FIGS. 9, 10, and 11 may be made more difficult in other sectors of the active training zone 15 where the surface of the sector may be that of an industrial-type low friction material simulating an icy road.

Other embodiments of the RDES 1 may include installation of a front (or rear) axle-yanking device within the active training zone 15. The axle-yanking field device serves to force vehicle 2 off balance and make it enter into a slide. The axle-yanking device forces drivers to experience the sensation of loss-of-control and sidewise G forces. This training exercise would enable a driver 3 to learn how to gain back vehicle 2 control without crashing the vehicle. The axle-yanking device typically will comprise an approximately 6.0 foot×12.0 foot sliding metal plate installed flush with the surface of the active training zone 15. The axle-yanking device being, powered by hydraulic, pneumatic, or electric servo drives, may move left or right upon receipt of an instantaneous signaling of the position of the axle of the vehicle 2 from the RDES 1 control unit 107.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions mat occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A method for training and evaluating a driver's skills in operating an automotive vehicle integrally equipped with an Onboard Diagnostics (OBD) jack and at least one mirror, when the driver encounters unexpected road hazards and emergencies, the method comprising the steps of:
    providing an outdoor closed driving course comprising a length of straightaway, said straightaway having one/third of its length as a paved acceleration zone and an entry zone, and two/thirds of its length as an active training zone, the active training zone comprising (a) an innermost roadway, (b) length-wise running left and right side control zones immediately bordering the innermost roadway, (c) length-wise running safety zones outward of and on the left and right sides of the control zones, and (d) a plurality of quick-acting solenoid valves, said solenoid valves further being routed to water jets embedded in the innermost roadway, said water jets having orifices for the ejection of vertical water streams;
    installing a plurality of vehicle electronic position sensors arranged at intervals along the length of the innermost roadway;
    providing visual marker points along the length of the active training zone;
    providing a control unit comprising a portable computer installed interiorly to the vehicle, the control unit further having software programmable for (a) the operation of said water jets in synchronization with the position of the vehicle as generated by the position sensors, and (b) the generation of specially-designed augmented reality images projectable onto the at least one mirror of the vehicle;
    providing a head-mounted display (HMD) having an internal screen or lens for the projection of augmented reality images onto said screen or lens, said HMD for wearing by the driver of the vehicle;
    providing at least one micro-camera affixed onto the HMD, or proximate the driver's head;
    connecting the control unit to the vehicle's on-board diagnostics jack; and
    providing a means for transmitting verbal or programmed electronic instructions to the driver to (a) don the HMD, (b) adhere to verbal or programmed instructions received through the HMD, (c) commence driving and accelerating to the entry zone, (d) maneuver the vehicle in response to the augmented reality images observed and the eruption of the water jets, and (e) repeat any exercise, as required.

2. The method as in claim 1, wherein said outdoor closed driving closed course is constructed on hilly terrain with at least one incline and at least one declination comprising the innermost roadway.

3. The driver training method as in claim 1, wherein the innermost roadway consists of a low-to-medium friction surface.

4. The driver training method as in claim 1, wherein the control zone comprises a surface of high-friction material.

5. The driver training method as in claim 1, wherein the safety zone comprises a layer of gravel extending to a depth below the top level of the control zone surface, and laid atop natural earth.

6. The driver training method as in claim 1, wherein (a) a head-mounted-display (HMD) is provided for wearing by the driver and (b) the control unit contains software programmable for generation of augmented reality images projectable onto the HMD.

7. The driver training method as in claim 1, wherein the straightaway comprises dimensions of six-hundred (600.0) feet in length and approximately eighty (80.0) feet in width.

8. The driver training system as in claim 1, wherein at least one axle-yanking device is installed on the surface of the innermost roadway.

9. The driver training method as in claim 1, wherein the control unit further contains coded marker points for indication to the driver specific areas and sectors of the active training zone.

10. An automotive driver training system for training a driver in coping with unexpected road hazards and emergencies while driving a vehicle which is integrally equipped with an Onboard Diagnostics (OBD) jack and at least one mirror, the system comprising:
    (a) an outdoor closed driving course comprising a length of straightaway, said straightaway having (i) one/third of its length as a paved acceleration zone, and (ii) two/thirds of its length as an active training zone; wherein
    (b) the active training zone comprises (i) an innermost roadway, (ii) length-wise running left and right side control zones immediately bordering the innermost roadway, (iii) length-wise running safety zones outward of and on the left and right sides of the control zones, (iv) a plurality of electronic position sensors, and (v) a plurality of quick-acting solenoid valves, said solenoid valves further being routed to water jets embedded in the innermost roadway, said water jets having orifices for the ejection of vertical water streams;
    (c) a control unit comprising a portable computer installed interiorly to the vehicle, the control unit further having software programmable for (i) the operation of said water jets in synchronization with the position of the vehicle as generated by the position sensors, and (ii) the generation of specially-designed augmented reality images projectable onto the at least one mirror of the vehicle;
    (d) a main water supply line and secondary water supply lines;
    (e) an axle-yanking device;
    (f) a cable and connectors compatible with the control unit and the vehicle's OBD jack;
    (g) a head-mounted display (HMD) having an internal screen and or lens;

(h) at least one micro-camera, integrated into the HMD or affixed proximate the driver;
(i) an audio system synchronized with the control unit and vehicle speakers;
(j) a gyroscopic head-tracker; and
(k) coded and/or specific visual marker points along the active training zone.

\* \* \* \* \*